2,581,857

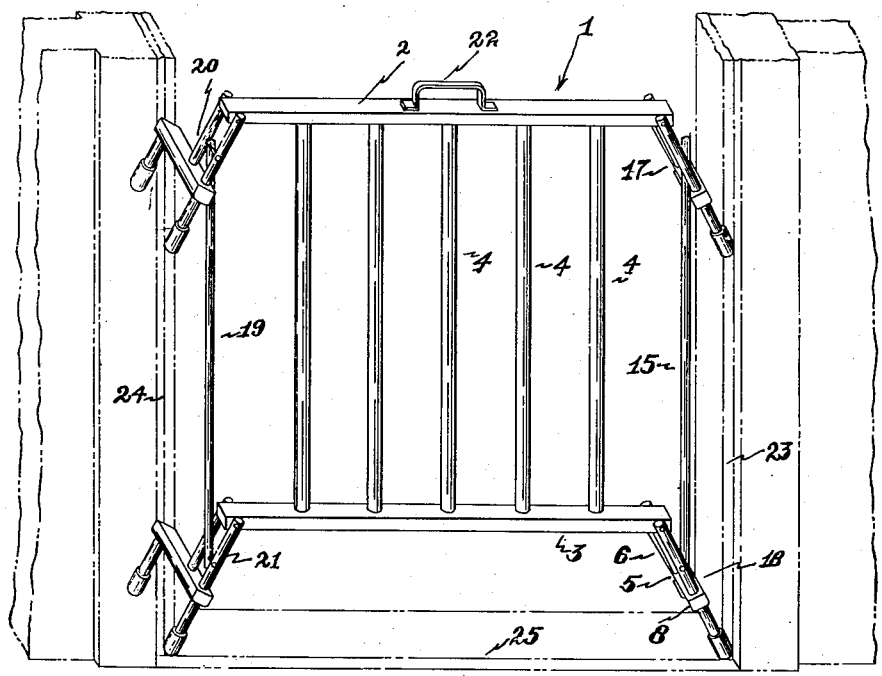
FIG. I
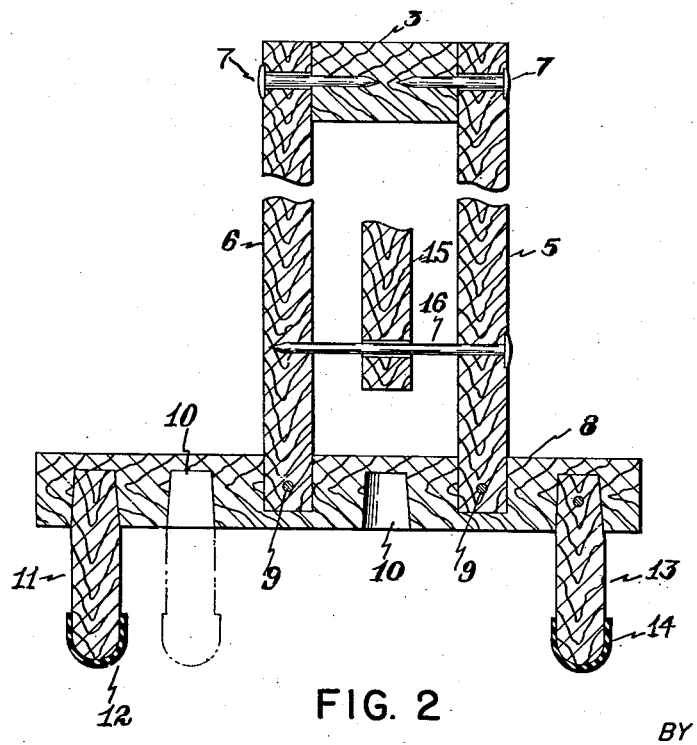
FIG. 2
INVENTOR
BERTRAM M. HARRISON
BY Ethel Wolf
HIS ATTORNEY Patented Jan. 8, 1952

UNITED STATES PATENT OFFICE 2,581,857

REMOVABLE GATE

Bertram M. Harrison, Wellesley, Mass.

Application March 29, 1948, Serial No. 17,771

4 Claims. (Cl. 160—217)

The present invention relates to a removable gate which may be used across an opening, such as a doorway or stairs, where side walls, supports, or bannisters are present. The gate is principally designed to keep small children, pets, or the like from passing through the door or gateway.

The gate of the present invention is put in place or removed at will, without nailing or attaching anything to the walls that will mark the walls in any way and without any effort as to fitting, adjustment, or the like. The gate is merely lowered between the posts or walls to put in place, and raised to remove.

Gates commonly used for the same purpose are usually provided with hinges so the gates may be swung open or closed and they have some permanent or semi-permanent attachment to the walls, door frames, or bannister posts which necessitates drilling holes or marking the walls in some way or another. Other types of gates, such as lazy tong gates which collapse instead of or in addition to hinging, are also attached to the wall permanently or semi-permanently. In the present invention, no attachment is made to the wall of such a nature that the gate may not be readily removed, and when the individual wishes to pass through, the gate is light enough in weight so that he simply raises it, walks through, and lowers it again. This can be done with one hand in the same simple manner as though it were hinged. The present invention therefore avoids the numerous objections to the prior child's gate and at the same time provides a construction which is extremely simple, inexpensive, light in weight, easy to handle, and of the simplest kind of mechanism.

Without further enumerating the merits and advantages of the present invention, an embodiment of the same will be described in the specification below in connection with the drawings illustrating the same, in which Fig. 1 shows an elevation of the gate with the door frame shown in phantom; and Fig. 2 shows a detail of the structure shown in Fig. 1.

In the arrangement shown in the figures, the gate 1 is made with the top bar 2 and the bottom bar 3, which may be of the order of ¾ of an inch thick and 1 inch wide, of wood or other suitable material. These pieces are joined together by light rods 4, 4, etc. extending vertically between the top and bottom bars. These rods may be shaped in square or other kinds of sections and may, in fact, be simple wooden dowels fitted into the faces of the bars 2 and 3, thus forming a complete frame which is extremely light in weight. At the ends of each of the bars there are pivoted pairs of extending arms, the construction of which is shown more fully in the section in Fig. 2.

Since each side of the frame is constructed in the same way, only one side will be described. Each of the arms 5 and 6 is pivoted horizontally by means of a nail, screw, or similar element 7 at the ends of the bar, as, for instance, at 3. The nail 7 will pass through clearance holes in the arms 5 and 6 and hold the arms against the bar 3, but in such a way as to permit rotation of the arms 5 and 6 about the nail 7 as a pivot. The nails are preferably provided with enlarged heads for strength and to prevent the arms from coming out. Instead of nails, pegs of wood or other material, or wood or machine screws, may be used. A cross bar or bridge 8 extends across the bottom from the arm 5 to the arm 6 in a horizontal direction. The arm 8 is in fact pinned or attached permanently to the ends of the arms 5 and 6 by suitable pinning elements 9, 9.

In order to provide adjustment so that the arms may enclose both sides of the door jamb, the bar 8 has a number of tapered recesses 10, 10 into which a tapered pin 11 capped at the end by a suitable soft rubber cover 12 may fit. The pin may be placed in either of the recesses to adjust for the width of the door jamb. A further pin 13 with a similar cover 14 may be permanently attached and pinned at one end of the bar 8. The hinged side arms at one side of the cross bars 2 and 3 are joined together by a rod 15 which is pivoted between the arms 5 and 6 by a nail 16, which passes through the rod and may be nailed to the arms 5 and 6 as indicated in Fig. 2. A clearance is provided for the nail 16 through the rod 15 so that it may be free and turn with respect to the nail, irrespective of the angular position of the arms. The rod 15 joins the upper and lower pivoted pair of arms 17 and 18 respectively, while the rod 19 joins the upper and lower pivoted arms 20 and 21. A handle 22 may be provided at the top of the cross bar 2.

Fig. 1 shows the gate in position between the door jambs with the capped ends at the bottom touching the floor and lying in the corner of the shoulders 23 and 24 formed around the frame of the door. As the gate is lowered into this position, the arms come against the floor 25 and are forced outward until they wedge into the position shown in Fig. 1. At the same time, the upper arms 17 and 20 are forced against the sides of the door frame in similar positions, thus holding the gate firmly at four places. It will be readily seen that the gate cannot be pushed inwardly or outwardly and that if someone wishes to pass through he simply lifts the gate upward at the handle 22 and draws it aside to pass through. Lifting the gate upwards drops the pivoted arms giving sufficient clearance to clear the door jamb with the gate, so as to permit its removal or passage through.

The gate as described may be used to block off a doorway or may be used in many other positions. If the side wall is flat and has no flange for the pivoted arms to lock to, a flat board with or without a friction surface on one side and with a flange on the face side may be placed upright against the wall, against which the arms of the gate may press to keep the gate in place. While the board so used may have a cloth surface facing the wall to prevent it from slipping, this is not necessary in many cases as usually the gate itself provides enough pressure and friction against the board to hold it against the wall and prevent slipping on either side.

While this whole structure may be made of light wood, light metal may also be used, or a combination of metal, plastic, or wood.

Having now described my invention, I claim:

1. A removable gate having a top and bottom rail, pairs of spaced arms, means pivoting said arms at the ends of both the top and bottom rails perpendicular to the plane of the gate, the pivot of each arm of a pair being in axial alignment with the other, means joining the pairs of arms on each side for simultaneous similar angular motion within desired limits, a cross support mounted across the ends of each lower pair of arms, and pin means adjustable in said support for effectively widening the gripping space across the door jamb of said arms.

2. A removable gate having a top and bottom rail joined by vertically extending rods, a plurality of arms, means pivoting said arms in pairs with each arm of a pair in alignment with the other arm of the pair at the ends of the rails on either side, the pivots being perpendicular to the rails, a joining rod member connecting each arm of a pair to the other arm of the pair, a vertical bar extending between the joining rods on one end of the rails, said structure being the same on each side of the gate, said joining rod member being journalled in each arm of a pair whereby the arms execute simultaneously the same movement, the pairs of arms on said lower rail extending outward and downward from the lower rail, having sufficient length to contact the outer shoulders of the door jamb on the floor.

3. A removable gate having a top and bottom rail joined by vertically extending rods, a plurality of arms, means pivoting said arms in pairs with each arm of a pair in alignment with the other arm of the pair at the ends of the rails on either side, the pivots being perpendicular to the rails, a joining rod member connecting each arm of a pair to the other arm of the pair, a vertical bar extending between the joining rods on one end of the rails, said structure being the same on each side of the gate, said joining rod member being journalled in each arm of a pair whereby the arms execute simultaneously the same movement, the pairs of arms on said lower rail extending outward and downward from the lower rail, having sufficient length to contact the outer shoulders of the door jamb on the floor, the arms of each pair having sufficient width across them so as to straddle a shoulder on the door jamb.

4. A removable gate comprising a frame, two pairs of arms at each end of the frame with one pair positioned near the bottom of the frame, means supporting the arms of each pair in spaced fixed relation to each other pivoted in axes normal to the frame at each side thereof, said arms having lengths sufficient to extend beyond the side of the frame, said pairs pivoted near the bottom of the frame having their pivots sufficiently low on the frame whereby the arms when swung downward will extend beyond the bottom of the frame, connecting link elements extending between each pair of arms at the sides of the frames and means freely pivoting said elements to the pairs of arms at each side of the frame for simultaneously swinging the pairs of arms on each side about their respective pivots.

BERTRAM M. HARRISON.

REFERENCES CITED

The following references are of record in the file of this patent:

UNITED STATES PATENTS

| Number | Name | Date |
| --- | --- | --- |
| 625,926 | Graham | May 30, 1899 |
| 774,428 | Hopp | Nov. 8, 1904 |
| 921,869 | Munn | May 18, 1909 |
| 2,298,352 | Downes | Oct. 13, 1942 |
| 2,348,561 | Mutch | May 9, 1944 |